United States Patent
Dürr et al.

(10) Patent No.: US 11,443,037 B2
(45) Date of Patent: Sep. 13, 2022

(54) IDENTIFICATION OF INVALID REQUESTS

(71) Applicant: International Business Machines Corporation, Armonk, NY (US)

(72) Inventors: Thomas Dürr, Magstadt (DE); Martin Smolny, Boeblingen (DE); Michael Beck, Bad Teinach-Zavelstein (DE); Sandra Rapp, Magstadt (DE)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 16/924,556

(22) Filed: Jul. 9, 2020

(65) Prior Publication Data

US 2022/0012332 A1   Jan. 13, 2022

(51) Int. Cl.
| | | |
|---|---|---|
| *G06F 17/00* | (2019.01) | |
| *G06F 21/55* | (2013.01) | |
| *G06F 16/23* | (2019.01) | |
| *G06F 16/245* | (2019.01) | |
| *H04L 29/06* | (2006.01) | |

(52) U.S. Cl.
CPC ........ *G06F 21/554* (2013.01); *G06F 16/2379* (2019.01); *G06F 16/245* (2019.01); *G06F 2221/034* (2013.01)

(58) Field of Classification Search
CPC .. G06F 16/2379; G06F 16/245; G06F 21/554; G06F 2221/034; H04L 63/1416; H04L 63/1458
See application file for complete search history.

(56) References Cited

U.S. PATENT DOCUMENTS

| | | | | |
|---|---|---|---|---|
| 9,842,045 B2* | 12/2017 | Heorhiadi | ........... | G06F 11/3692 |
| 9,875,086 B1* | 1/2018 | Anderson | ........... | G06F 11/3006 |
| 10,255,413 B2* | 4/2019 | Gaur | ................... | H04L 63/0807 |
| 10,599,498 B2* | 3/2020 | Nakaike | ................. | G06F 9/547 |
| 10,958,757 B2* | 3/2021 | Appajanna | .............. | H04L 67/60 |

(Continued)

FOREIGN PATENT DOCUMENTS

| | | |
|---|---|---|
| CN | 108449308 A | 8/2018 |
| CN | 109408207 A | 3/2019 |

(Continued)

OTHER PUBLICATIONS

"Patent Cooperation Treaty PCT International Search Reort", Applicant's file reference: P202000144PCT01, International application No. PCT/IB2021/055624, International filing date Jun. 24, 2021, dated Oct. 8, 2021, 9 pages.

(Continued)

*Primary Examiner* — Gary S Gracia
(74) *Attorney, Agent, or Firm* — Stephen R. Yoder

(57) ABSTRACT

Aspects of the present invention disclose a method for handling incoming microservice requests at an application server. The method includes one or more processors identifying a microservice request of a user at an application server. The method further includes querying a database associated with the application server for a feedback history corresponding to the microservice request. The method further includes collecting a response corresponding to the microservice request of the user. The method further includes generating a rule corresponding to the microservice request based at least in part on the response corresponding to the microservice request.

24 Claims, 5 Drawing Sheets

(56) References Cited

U.S. PATENT DOCUMENTS

| | | | | |
|---|---|---|---|---|
| 11,012,520 | B2* | 5/2021 | Gunjal | G06F 9/5083 |
| 11,144,439 | B2* | 10/2021 | Reeve | G06F 11/3688 |
| 11,151,283 | B2* | 10/2021 | Schwed | H04L 63/0414 |
| 11,271,826 | B2* | 3/2022 | Brown | G06F 11/00 |
| 11,321,322 | B2* | 5/2022 | Liu | G06F 16/24542 |
| 2018/0254996 | A1* | 9/2018 | Kairali | H04L 67/1036 |
| 2018/0270122 | A1* | 9/2018 | Brown | H04L 67/30 |
| 2018/0288094 | A1* | 10/2018 | Ahuja | H04L 63/1416 |
| 2018/0365008 | A1* | 12/2018 | Chandramouli | G06F 8/76 |
| 2019/0180002 | A1* | 6/2019 | Gaur | H04L 63/0807 |
| 2019/0253424 | A1* | 8/2019 | Burckhardt | G06F 21/604 |
| 2019/0273746 | A1* | 9/2019 | Coffing | G06Q 20/40 |
| 2019/0387014 | A1 | 12/2019 | Zhou | |
| 2020/0045068 | A1* | 2/2020 | Jain | H04L 63/0281 |
| 2020/0174915 | A1* | 6/2020 | Reeve | G06K 9/6219 |
| 2020/0195528 | A1* | 6/2020 | Barton | H04L 41/0894 |
| 2020/0336553 | A1* | 10/2020 | Yeddula | H04L 45/308 |
| 2020/0344109 | A1* | 10/2020 | Shil | H04L 41/0233 |
| 2020/0351392 | A1* | 11/2020 | Bomma | H04L 67/1097 |
| 2020/0364128 | A1* | 11/2020 | Vittal | G06F 11/3055 |
| 2021/0191706 | A1* | 6/2021 | Sn | G06F 9/24 |
| 2021/0211363 | A1* | 7/2021 | Papacica | H04L 41/5058 |

FOREIGN PATENT DOCUMENTS

| | | |
|---|---|---|
| CN | 109905376 A | 6/2019 |
| CN | 110554927 A | 12/2019 |

OTHER PUBLICATIONS

Kedar, "Demystifying API Rate Limiting", May 31, 2018, 7 pps., <https://developer.akamai.com/blog/2018/05/30/demystifying-api-rate-limiting>.

Mell et al., "The NIST Definition of Cloud Computing", National Institute of Standards and Technology, U.S. Department of Commerce, NIST Special Publication 800-145, Sep. 2011, 7 pages.

Paprocki, "How to Design a Scalable Rate Limiting Algorithm", 21 pps., Dec. 19, 2017, <https://konghq.com/blog/how-to-design-a-scalable-rate-limiting-algorithm/>.

Rawdat, "Rate Limiting with NGINX and NGINX Plus", NGINX, Jun. 12, 2017, 12 pps., <https://www.nginx.com/blog/rate-limiting-nginx/>.

* cited by examiner

IDENTIFICATION OF INVALID REQUESTS

BACKGROUND OF THE INVENTION

The present invention relates generally to the field of application programming interface governance and more particularly to identifying invalid requests.

A primary objective of rate limiting is to prevent infrastructure from being overwhelmed by application programming interface (API) requests from users, ensuring availability and reliability for all API consumers. Rate limiting accomplishes this by counting requests in a given time period and applying specified limitations to those requests. User quota also counts requests but serves a very different purpose. Quota management helps enforce service level agreement (SLA)s for API consumers by allowing you to limit the number of API requests consumers can make in a longer time interval. However, with regard to rate limiting, challenges exist with determining valid classifications for a request because properties of the request may not indicate legitimacy of the request.

In computer networks, rate limiting is used to control the rate of requests sent or received by a network interface controller as well as to prevent denial-of-service attack (DoS) attacks. A DoS attack is a cyber-attack in which a perpetrator seeks to make a machine or network resource unavailable to intended users by temporarily or indefinitely disrupting services of a host connected to the Internet. Denial of service is typically accomplished by flooding a targeted machine or resource with superfluous requests in an attempt to overload systems and prevent some or all legitimate requests from being fulfilled.

An application layer distributed-denial-of-service (DDoS) attack (e.g., sometimes referred to as layer 7 DDoS attack) is a form of DDoS attack where attackers target application-layer processes. The attack over-exercises specific functions or features of a website with the intention to disable those functions or features. This application-layer attack is different from an entire network attack and is often used against financial institutions to distract IT and security personnel from security breaches.

SUMMARY

Aspects of the present invention disclose a method, computer program product, and system for handling incoming microservice requests at an application server. The method includes one or more processors identifying a microservice request of a user at an application server. The method further includes one or more processors querying a database associated with the application server for a feedback history corresponding to the microservice request. The method further includes one or more processors collecting a response corresponding to the microservice request of the user. The method further includes one or more processors generating a rule corresponding to the microservice request based at least in part on the response corresponding to the microservice request.

In another embodiment, the method further includes one or more processors, determining that the generated rule of the database corresponds to the second microservice request. The method further includes one or more processors returning the response of the generated rule. Accordingly, embodiments of the present invention can operate to increase the efficiency of the computing system by reducing the amount of processing resources utilized to process and return a response to the malicious and/or invalid requests.

DETAILED DESCRIPTION

Embodiments of the present invention allow for identification and denial of malicious request microservices and/or resources. Embodiments of the present invention perform transaction-based correlations of relevant input parameters of a request with request response parameters. Embodiments of the present invention generate a rule based on correlations of input parameters of the request and the response parameters of a request transaction. Additional embodiments of the present invention utilize a generated rule corresponding to a transaction to determine whether to progress, block, and/or deny a request of a user.

Some embodiments of the present invention recognize challenges with implementations for limiting malicious requests of users transmitted to a computing system. Current remedies for such challenges classify a request based on properties of the request and block the request once the request exceeds a defined threshold within a specified timeframe. However, current remedies allow illegitimate requests below the defined threshold to be processed, blocking of legitimate and illegitimate requests exceeding the defined threshold, and classification may not identify a caller (e.g., user) of the request (e.g., Internet Protocol (IP) address mapped by a gateway IP). Various embodiments of the present invention remedy such challenges of current remedies by utilizing properties of a token service to identify a request of a caller based on properties of the request and utilize the feedback corresponding to the request to a generate rule to deny or allow the request based on the generated rule.

Embodiments of the present invention recognize that computing systems hosting a large set of microservices and/or resources receive a substantial amount traffic that includes requests, which may be malicious or invalid. As a result, the computing systems utilizes a substantial amount of processing resources processing the malicious and/or invalid requests. Various embodiments of the present invention can operate to increase the efficiency of the computing system by reducing the amount of processing resources utilized to process and return a response to the malicious and/or invalid requests. The embodiments of the present invention accomplish the reduction in processing resource utilization by utilizing a rate limiter to determine whether to deny or block a request based on generated rules corresponding to the request.

Figure 1:
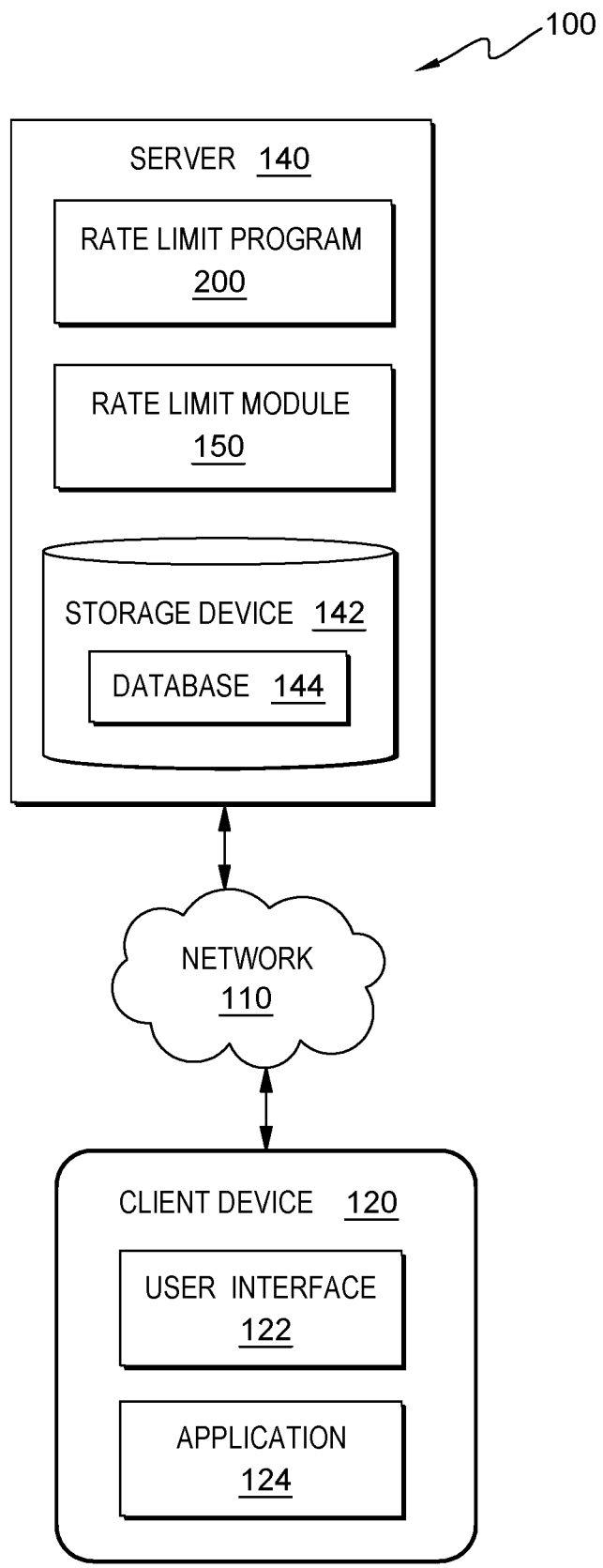
FIG. 1 is a functional block diagram of a data processing environment, in accordance with an embodiment of the present invention.

Implementation of embodiments of the invention may take a variety of forms, and exemplary implementation details are discussed subsequently with reference to the Figures. Some embodiments will be described in more detail with reference to the accompanying drawings, in which the embodiments of the present invention have been illustrated. However, the present invention can be implemented in various manners, and thus should not be construed to be limited to the embodiments disclosed herein. The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as storage device 142, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Rate limit program 200 and rate limit application 96 hereafter referred to as "Program" enables the authorized and secure processing of personal data. Program provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Program provides information regarding personal data and the nature (e.g., type, scope, purpose, duration, etc.) of the processing. Program provides the user with copies of stored personal data. Program allows the correction or completion of incorrect or incomplete personal data. Program allows the immediate deletion of personal data.

Distributed data processing environment 100 includes server 140 and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API). For example, user interface 122 is based on a representational state transfer (REST) API, an architectural style and approach to communications often used in web services development.

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment (e.g., cloud computing node 10, cloud computing environment 50). In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, rate limit module 150, and rate limit program 200. Storage device 142 can be implemented with any type of storage device, for example, persistent storage 305, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores numerous types of data which may include database. Database 144 may represent one or more organized collections of data stored and accessed from server 140. For example, database 144 includes request entries, request types, a negative or positive expired request history, response types, rate counts, expiration dates, request properties, etc. Database 144 may represent a feedback store of rate limit module 150. In one embodiment, data processing environment 100 can include additional servers (not shown) that host additional information that accessible via network 110.

Rate limit module 150 is used to control the amount of incoming and outgoing traffic. Rate limit module 150 may include a dedicated storage device similar to storage device 142. In one embodiment, rate limit program 200 utilizes rate limit module 150 to implement user rate limiting and quota management. For example, rate limit module 150 is integrated into server 140 via a programming language or a caching mechanism to prevent infrastructure overloads, infrastructure attacks (e.g., denial-of-service (DoS) attack, distributed-denial-of-service (DDoS) attack, etc.), block other types of suspicious activity as well as enforce services level agreements (SLAs). Additionally, rate limit module 150 counts requests in a given time period and applies specified limitations based on generated rules to the requests.

Rate limit program 200 can associate the number of requests a user is making based on an API key, token, or IP address, to determine whether the user exceeds a rate limit and denies any further requests until the user contacts an administrator to increase the rate limit or wait until a rate limit timeframe expires. In various embodiments of the present invention, rate limit program 200 can operate to prevent infrastructure from being overwhelmed by API requests from legitimate users, ensuring availability and reliability for all API consumers. Additionally, limiting the number of API requests users can make over longer time intervals.

In one embodiment, rate limit program 200 queries rate limit module 150 for information. For example, rate limit program 200 receives a microservice request from client device 120 and transmits a query to rate limit module 150 for available request history (e.g., information, corresponding rules, request response, etc.) for a request type (e.g., request properties) of the microservice request with identical input parameters. In this example, rate limit program 200 stores an entry corresponding to the microservice request that includes the request type, a negative or positive expired request history, response type, and an expiration date in a feedback store (e.g., database 144) of rate limit module 150. Additionally, rate limit program 200 increments a rate counter of rate limit module 150 returning a positive expired request history (e.g., not expired request history) and updating an expiration date corresponding to the request type of the microservice request with a response type and incrementing a rate counter with respect to the response type.

In another embodiment, rate limit program 200 generates a rule corresponding to a request of client device 120. For example, rate limit program 200 correlates request and response data of a microservice request to generate a rule that to utilize in determining if the microservice request is valid or must be denied. In this example, rate limit program 200 enables rate limit module 150 to utilize the generated rule corresponding to the microservice request based on the response type for the microservice request exceeding a threshold value of rate limiting module 150 for a predetermined timeframe (e.g., expiration date).

Figure 2:
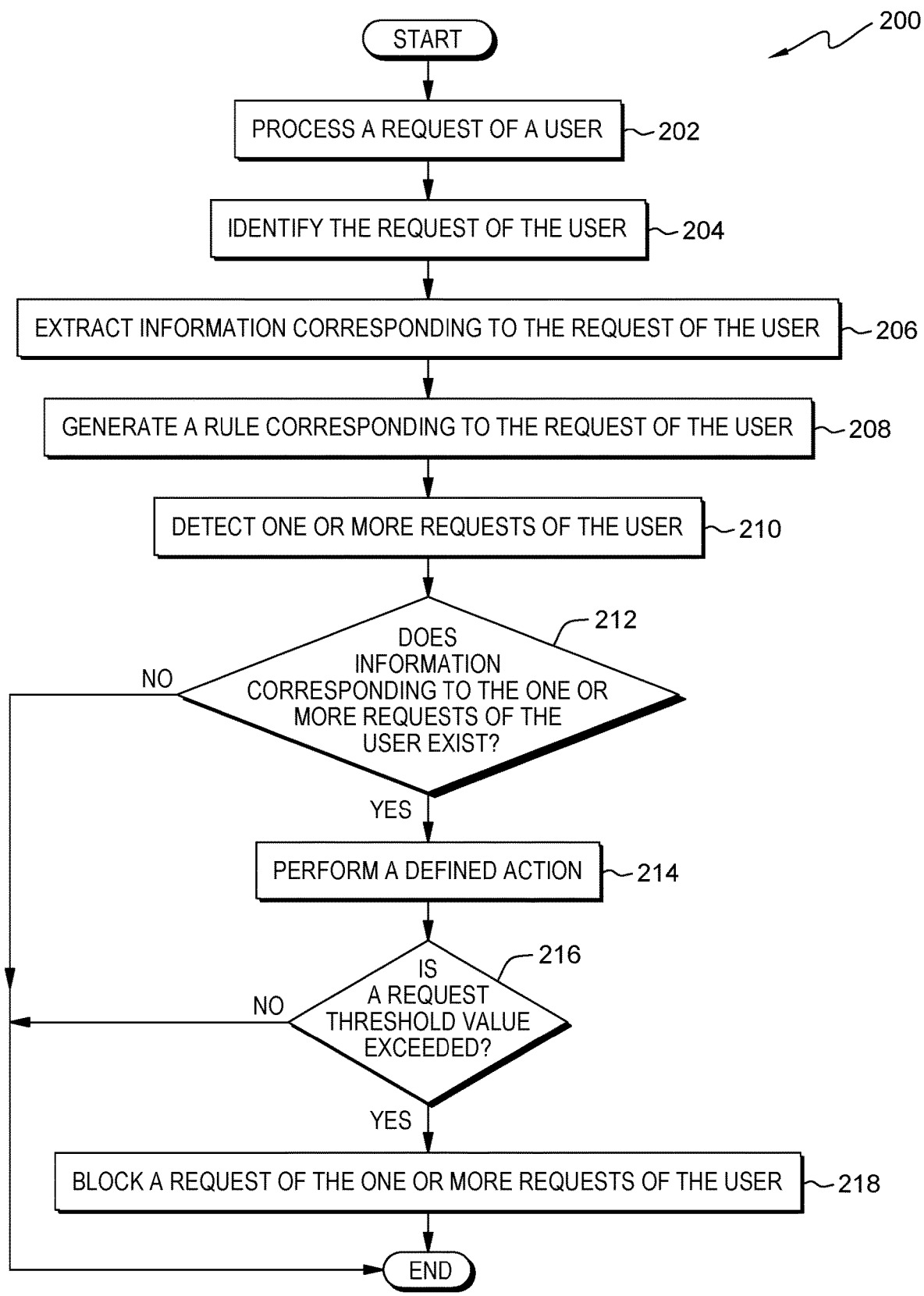
FIG. 2 is a flowchart depicting operational steps of a program, within the data processing environment of FIG. 1, for handling incoming requests for microservices by classifying the requests based on properties, and blocking certain requests based on occurrence/threshold to prevent processing of the requests, in accordance with embodiments of the present invention.

FIG. 2 is a flowchart depicting operational steps of rate limit program 200, a program that handles incoming requests for microservices by classifying the requests based on properties, and blocking certain requests based on occurrence/threshold to prevent processing of the requests, in accordance with embodiments of the present invention. In one embodiment, rate limit program 200 initiates in response to a user connecting client device 120 to rate limit program 200 through network 110. For example, rate limit program 200 initiates in response to a user registering (e.g., opting-in) a laptop (e.g., client device 120) with rate limit program 200 via a WLAN (e.g., network 110). In another embodiment, rate limit program 200 is a background application that continuously monitors server 140. For example, rate limit program 200 initiates in response to server 140 receiving a request from a laptop (e.g., client device 120) of a user.

In step 202, rate limit program 200 processes a request of a user. In various embodiments an API key often acts as both a unique identifier and a secret token for authentication and will generally have a set of access rights on the API associated with the API key. Generally, API keys are not considered secure because API keys are typically accessible to clients, which makes an API key easy to steal. Once the API key is stolen, the API key has no expiration and may be used indefinitely, unless an administrator revokes or regenerates the API key. If the API key is meant to be accessible to the client, then the API key is only considered secure if used together with other security mechanisms (e.g., HTTPS/SSL).

In one embodiment, rate limit program 200 passes a request of client device 120 to server 140. For example, rate limit program 200 allows a user to transmit (e.g., send as a query string, request header, cookie, etc.) a REST call from a laptop (e.g., client device 120) through a rate limiter (e.g., rate limit module 150) to a token service of a server (e.g., server 140) to grant a valid token (e.g., HTTP Basic authentication, username/password schemes, etc.) to access one or more microservices. In this example, rate limit program 200 scans a feedback store (e.g., database 144) of the rate limiter for feedback corresponding to the REST call and is not able to identify any corresponding feedback. As a result, rate limit program 200 allows (i.e., grants access) the REST call to pass to the token service of the server to process the REST call, determines the API key is invalid, and returns a response (e.g., feedback) to the user that includes a status code (e.g., unauthorized, not found, not allowed, too many request, found, OK, etc.). Additionally, rate limit program 200 stores an entry corresponding to the REST call that includes a call properties (e.g., names, descriptions, bind address, follow redirects, username, passwords, etc.) and response type (e.g., feedback, status codes, etc.) in the feedback store of the rate limiter.

In step 204, rate limit program 200 identifies the request of the user. In one embodiment, rate limit program 200 identifies a request that a user of client device 120 transmits to server 140. For example, rate limit program 200 requests tracing to retrieve information of a REST call of a laptop (e.g., client device 120) of a user to a server (e.g., server 140) and identifies input parameters (e.g., string of characters that include call parameters, resource description, endpoints and methods, etc.) corresponding to the REST call. In another example, rate limit program 200 can generate an entry and corresponding key-value for a REST call in a database object (e.g., table) that rate limit program 200 passes to a token service of a server (e.g., server 140), which is stored in a memory device (e.g., storage device 142) of a rate limiter (e.g., rate limit module 150) of the server. In another example, rate limit program 200 can blacklist a REST call of a laptop (e.g., client device 120) of a user to a server (e.g., server 140).

In step 206, rate limit program 200 extracts information corresponding to the request of the user. In one embodiment, rate limit program 200 extracts information from a response from server 140 to a request of client device 120. For example, rate limit program 200 extracts textual data of a response (e.g., status code, feedback, etc.) by a token service of a server (e.g., server 140) corresponding to a REST call of a laptop (e.g., client device 120) of a user. In this example, rate limit program 200 utilizes natural language processing (NLP) techniques to parse, identify, and extract a status code (e.g., response type) of the response to the REST call. Additionally, rate limit program 200 stores the status code in a feedback store (e.g., database 144, storage device 142) of a rate limiter (e.g., rate limit module 150). In another example, rate limit program 200 transmits a notification to a feedback store of a rate limiter that includes status code and error description correspond to a REST call received at a server (e.g., server 140) from a laptop (e.g., client device 120) of a user.

In step 208, rate limit program 200 generates a rule corresponding to the request of the user. In one embodiment, rate limit program 200 generates a rule corresponding to a request of client device 120 to a response of server 140 and defines limitations for the generated rule. For example, rate limit program 200 correlates a request type (e.g., identified REST call, input parameters, etc.) and response type (e.g., feedback, status code, etc.) a REST call of a user stored in a feedback store (e.g., storage device 142) of a rate limiter (e.g., rate limit module 150). As a result, rate limit program 200 determines that a request that includes the request type of the REST call results in the response type of the REST call, generates a rule for the REST call of the user to instruct the rate limiter to transmit information (e.g., feedback, status code, etc.) of the response type to the laptop of the user when the request type is received. Additionally, rate limit program 200 increments a value corresponding to the number of occurrences that the REST call of the user is received by the rate limiter in the feedback store and sets an expiration date on the generated rule (e.g., feedback history) (i.e., allowing feedback history to expire after a given timeframe to allow for re-validation if an API key is still considered as invalid). In this example, rate limit program 200 sets a call/minute limit (e.g., request threshold value) corresponding to the rule, which reduces the amount of processing resources a token service of the server utilizes by off-loading a portion of the request processing to the rate limiter.

In step 210, rate limit program 200 detects one or more requests of the user. In one embodiment, rate limit program 200 utilizes rate limit module 150 to detect one or more requests of client device 120 transmitted through network 110. For example, rate limit program 200 monitors a rate limiter (e.g., rate limit module 150) to detect REST calls of one or more users. In this example, rate limit program 200 monitors the rate limiter and identifies a REST call from a user requesting access to an API of a server (e.g., server 140).

In decision step 212, rate limit program 200 determines whether information corresponding to the one or more requests of the user exist. In one embodiment, rate limit program 200 determines whether storage device 142 includes a rule corresponding to a request of client device 120. For example, rate limit program 200 queries a feedback store (e.g., storage device 142) of a rate limiter (e.g., rate limit module 150) for feedback history of a request type of with matching input parameters of detected REST call (as discussed in step 210) and determines whether the feedback history is expired. In this example, if rate limit program 200 determines that a string of characters corresponding to input parameters of the feedback history and of the REST call are identical, then rate limit program 200 determines whether an expiration date of the feedback history has passed.

In another embodiment, if rate limit program 200 determines that storage device 142 does not include a rule corresponding to a request of client device 120 (decision step 212, "NO" branch), then rate limit program 200 passes a request of client device 120 to server 140. For example, if rate limit program 200 queries a feedback store of a rate limiter and determines that a string of characters corresponding to a REST call and input parameters of the feedback history are not a match, then rate limit program 200 passes the REST call to a token service of a server (e.g., server 140). Additionally, rate limit program 200 stores an entry corresponding to the REST call in the feedback store of the rate limiter. In an alternative example, if rate limit program 200 queries a feedback store of a rate limiter and determines that a string of characters corresponding to a REST call and input parameters of the feedback history are not a match, then rate limit program 200 can terminate (e.g., end).

In another example, if rate limit program 200 queries a feedback store of a rate limiter and determines that a string of characters corresponding to a REST call and input parameters of the feedback history are a match. Additionally, rate limit program 200 identifies a negative expired request history of the feedback store is expired, drops (e.g., deletes, removes) the feedback history, and passes the REST call to a token service of a server (e.g., server 140). As a result, rate limit program 200 then generates a new rule corresponding to the REST call and resets the expiration of feedback history corresponding to the REST call to allow for revalidation of the REST call.

In another embodiment, if rate limit program 200 determines that storage device 142 does include a rule corresponding to a request of client device 120 (decision step 212, "YES" branch), then rate limit program 200 performs a defined action based on a rule of storage device 142 (step 214). For example, if rate limit program 200 determines that a string of characters corresponding to a REST call and input parameters of the feedback history are a match and the feedback history is not expired (e.g., positive expired request history), then rate limit program 200 returns information corresponding to a request type (e.g., status code, error code, etc.) to the user.

In step 214, rate limit program 200 performs a defined action. In one embodiment, rate limit program 200 utilizes rate limit module 150 to perform actions corresponding to a generated rule of storage device 142. For example, rate limit program 200 utilizes a rate limiter (e.g., rate limit module 150) to transmit a response type (e.g., a status code) of feedback history of a feedback store (e.g., storage device 142) that corresponds to a REST call to a laptop (e.g., client device 120) of a user. Also, rate limit program 200 increments a counter of the rate limiter corresponding to the REST call and resets a corresponding expiration date. In an alternative example, rate limit program 200 can drop feedback history from the rate limiter after an expiration date of an entry of a REST call. As a result, rate limit program 200 allows for prioritize traffic by routing specific API consumers to a token service of a server (e.g., server 140) while transmitting an alternate JSON response to other consumers.

In decision step 216, rate limit program 200 determines whether a request threshold value exceeded. In one embodiment, rate limit program 200 determines whether a user of client device 120 has exceeded a request threshold of rate limit module 150. For example, rate limit program 200 queries a feedback store (e.g., storage device 142) of a rate limiter (e.g., rate limit module 150) for feedback history (e.g., received request count) of a request type with matching input parameters of a detected REST call (as discussed in step 210). In this example, rate limit program 200 determines whether a value corresponding to the received request count of the feedback history is greater than a request threshold value (e.g., limit, rate, etc.) for a defined time frame (e.g., milli-seconds, seconds, minute, hour, days, etc.).

In another embodiment, if rate limit program 200 determines that a user of client device 120 has not exceeded a request threshold of rate limit module 150 (decision step 216, "NO" branch), then rate limit program 200 utilizes rate limit module 150 to perform actions corresponding to a generated rule of storage device 142. For example, if rate limit program 200 determines that a rate limiter (e.g., rate limit module 150) received a REST call ten (10) times in an hour (e.g., limit) from a received request count of feedback history is less than a request threshold value twenty (20) request calls per hour. As a result, rate limit program 200 transmits a response type (e.g., status code) to a laptop (e.g., client device 120) of a user that corresponds to the request type of the feedback history. In an alternative example, if a received request count of feedback history is less than a request threshold value, then rate limit program 200 can terminate (e.g., end).

In another embodiment, if rate limit program 200 determines that a user of client device 120 has exceeded a request threshold of rate limit module 150 (decision step 212, "YES" branch), then rate limit program 200 utilizes rate limit module 150 to block requests of client device 120 (step 218). For example, rate limit program 200 determines that a rate limiter (e.g., rate limit module 150) received a REST call twenty-one (21) times in an hour (e.g., limit) from a received request count of feedback history, which is greater than a request threshold value twenty (20) request calls per hour. As a result, rate limit program 200 transmits blocks calls corresponding to a laptop (e.g., client device 120).

In step 218, rate limit program 200 blocks the one or more requests of the user. In one embodiment, rate limit program 200 blocks request of client device 120 for a defined timeframe. For example, rate limit program 200 controls a number of REST calls (e.g., 10 calls/second) a user of a laptop (e.g., client device 120) can request of a server (e.g., server 140) for microservices/resources. In this example, rate limit program 200 can utilize a rate limiter (e.g., rate limit module 150) to block (e.g., deny) the user of the laptop from requesting microservices/resources of the server. Additionally, this methodology can be utilized to increase availability for a wide range of consumers to request microservices/resources from the server by ensuring that one or more users cannot dominate (e.g., DoS attack, DDoS attack, etc.). Furthermore, allowing an administrator to limit the number of API requests by API key (e.g., token), thereby allowing the administrator to enforce business SLAs and monetize APIs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
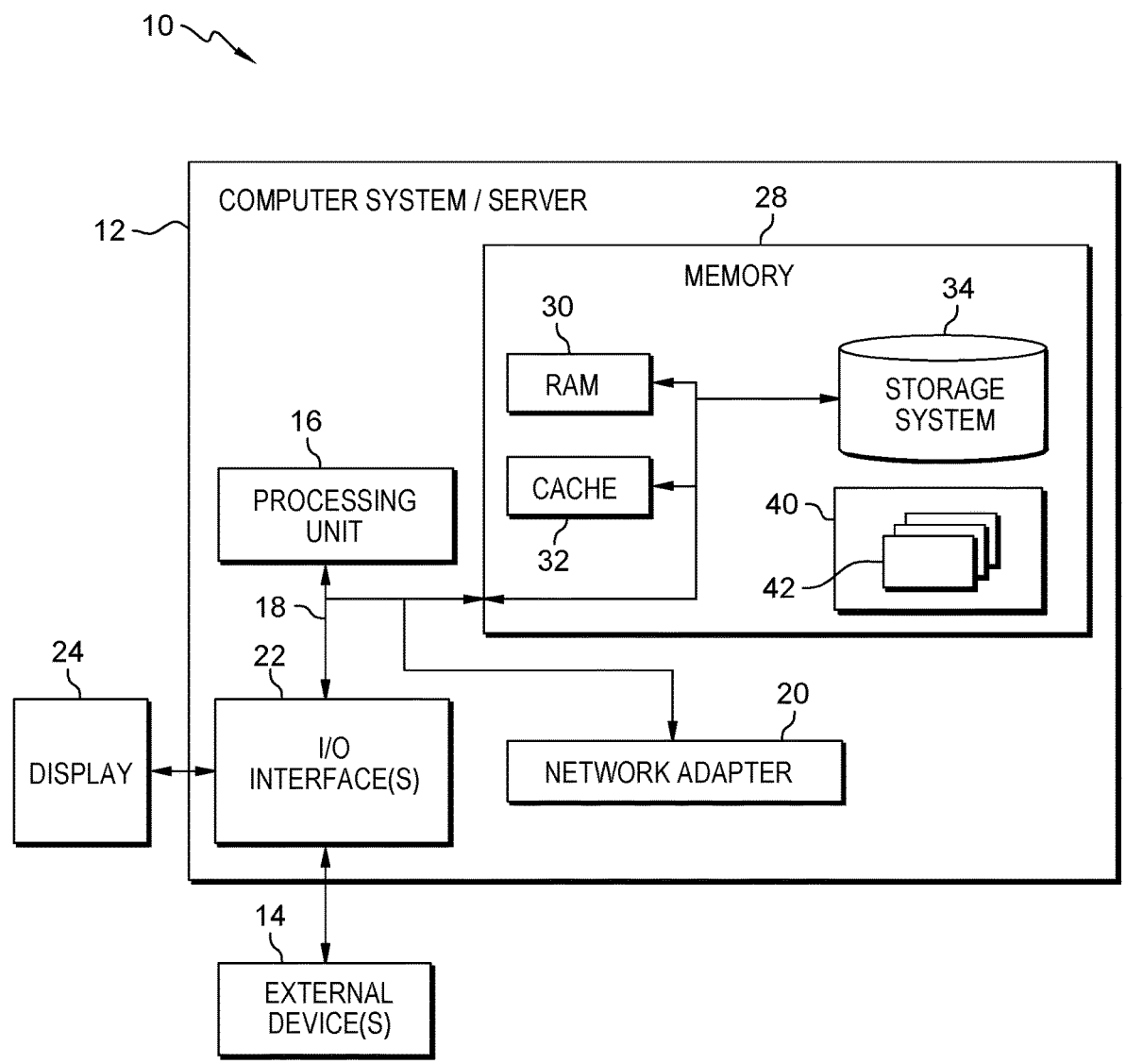
FIG. 3 depicts a cloud computing node, in accordance with an embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units, a system memory 28, and a bus 18 that couples various system components including system memory 28 to processor 16.

Bus 18 represents one or more of any of multiple types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
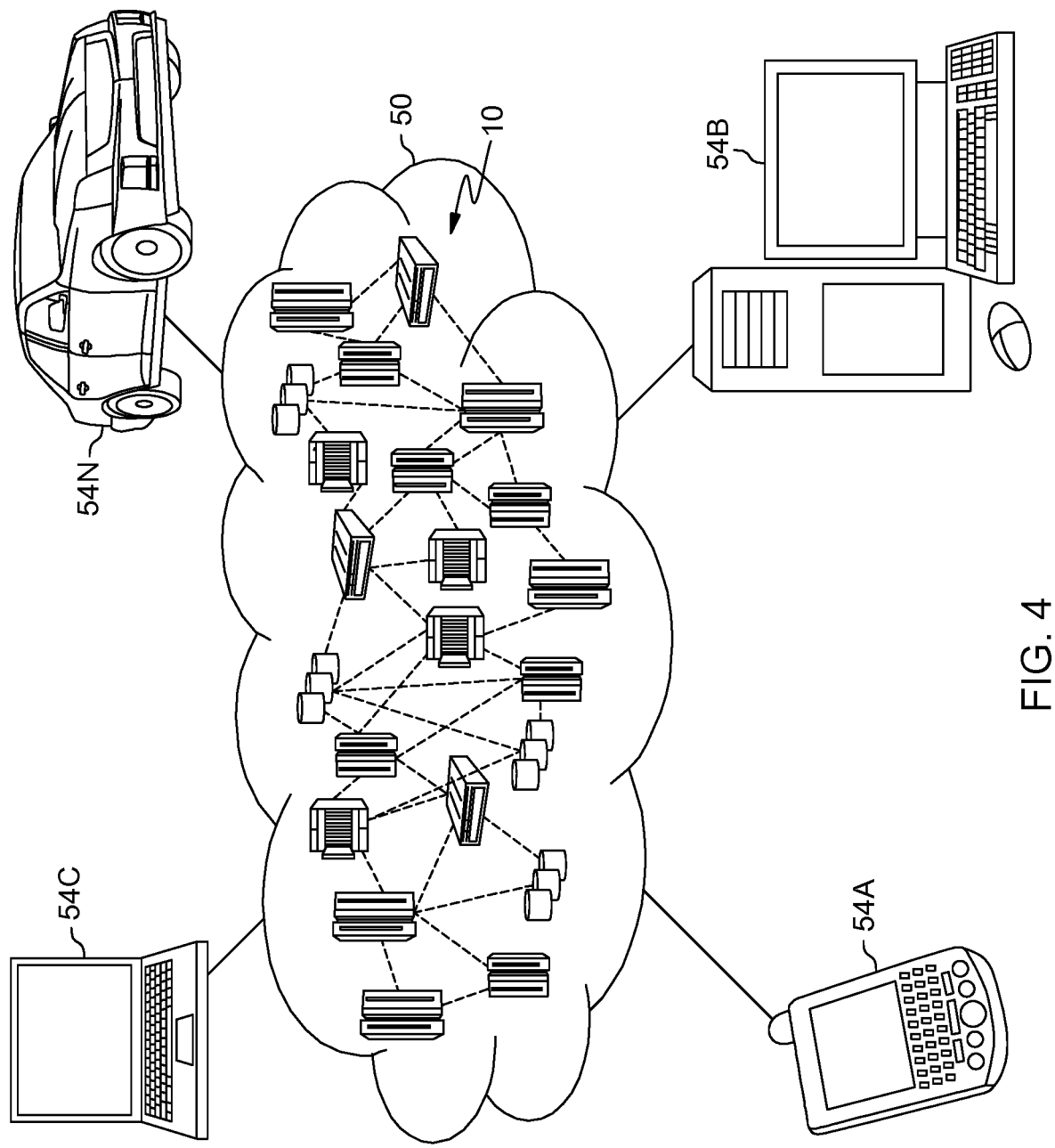
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
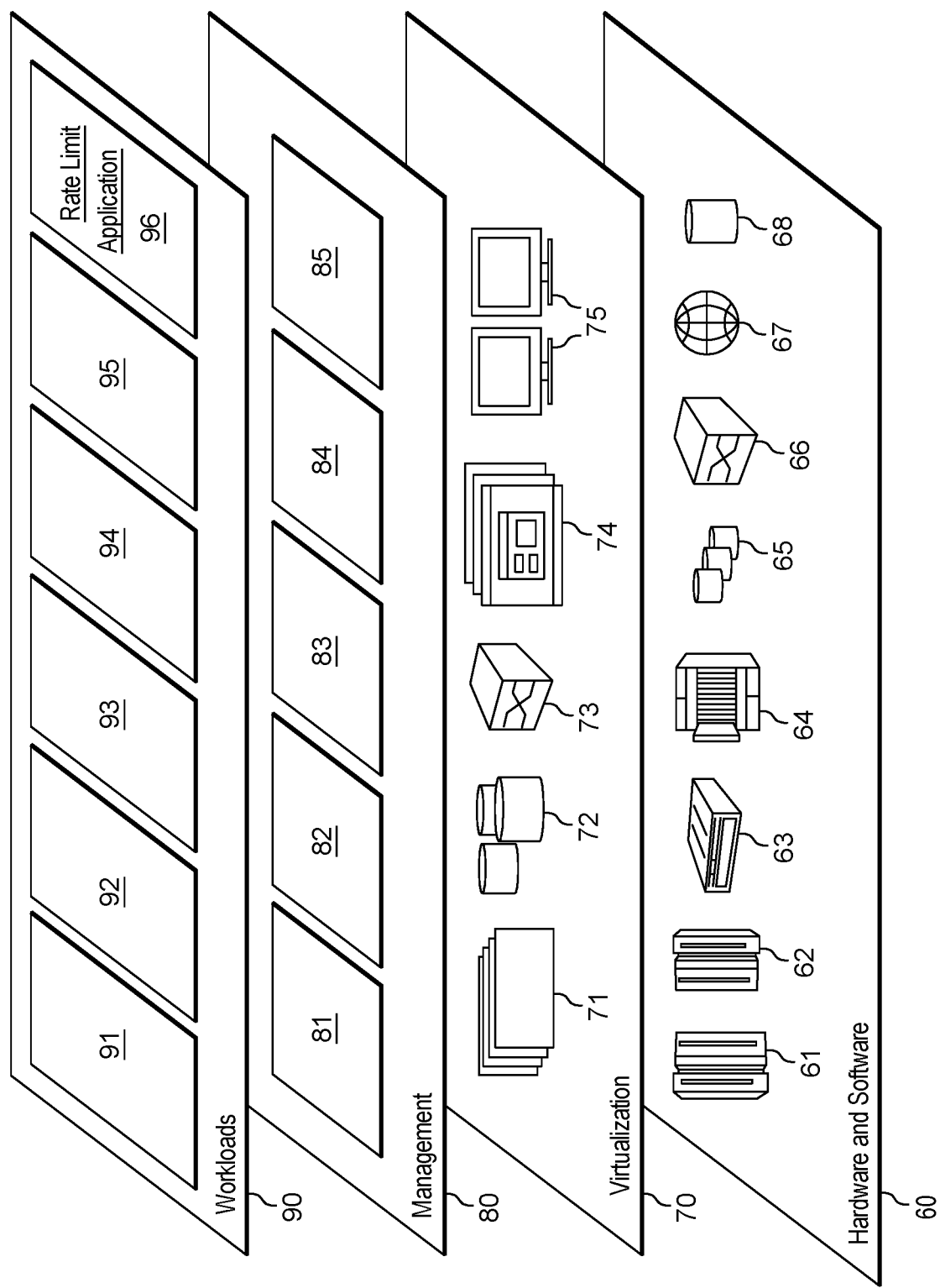
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and rate limit application 96 for various workloads and functions for handling incoming microservice requests at an application server in a cloud system, and in particular, for classifying the requests based on properties, and blocking certain requests based on occurrence/threshold to prevent processing of the requests similar to the methodology described above with respect to rate limit program 200. One of ordinary skill in the art will appreciate that rate limit application 96 may also work in conjunction with other portions of the various subtraction layers, such as those in hardware and software 60, virtualization 70, management 80, and other workloads 90 (such as data analytics processing 94, for example) to accomplish the various purposes of the illustrated embodiments of the present invention.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

Generally, cloud environments consist of a large set of independent microservices, which communicate usually via REST calls, which are authenticated with tokens granted by identity services using credentials like API keys. Furthermore, 30% of current Token Service REST traffic is due to malicious or invalid token requests. As a result, 30% of all token processing is unnecessary load and requires cost intensive over-provision to keep a service reliable. In scenarios where token requests come with an invalid API key or refresh token embodiments of the present invention identify the requests causing invalid token grants and prevent the invalid token grants from being processed.

he programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for handling incoming microservice requests at an application server, the method comprising:
    identifying a first microservice request at an application server;
    querying a database associated with the application server for a feedback history corresponding to the first microservice request;
    collecting a response corresponding to the first microservice request; and
    generating a rule corresponding to the first microservice request based at least in part on the response corresponding to the first microservice request; and
    updating the feedback history corresponding to the first microservice request based at least in part on the generated rule, wherein updating the feedback history further comprises:
        incrementing a counter corresponding to the first microservice request; and
        resetting an expiration date corresponding to the first microservice request, wherein the expiration date is a defined time period that the feedback history is valid.

2. The method of claim 1, further comprising:
    in response to receiving a second microservice request, determining, by one or more processors, that the generated rule of the database corresponds to the second microservice request; and
    returning, by one or more processors, the response of the generated rule.

3. The method of claim 1, further comprising:
    in response to receiving a second microservice request, determining, by one or more processors, that the second microservice request exceeds a defined request limit of the generated rule; and
    blocking, by one or more processors, further iterations of microservice requests of the user corresponding to the generated rule.

4. The method of claim 1, further comprising:
    determining, by one or more processors, that the feedback history of the database associated with the application server is expired; and
    removing, by one or more processors, the generated rule corresponding to the feedback history from the database.

5. The method of claim 1,
    wherein the counter is incremented in response to receiving the first microservice request at the application server.

6. The method of claim 1, wherein identifying the first microservice request of the user at the application server, further comprises:
    requesting, by one or more processors, tracing of the first microservice request; and
    extracting, by one or more processors, input parameters corresponding to the first microservice request.

7. The method of claim 1, wherein querying the database associated with the application server for the feedback history corresponding to the first microservice request, further comprises:
    transmitting, by one or more processors, a request for information to the database, wherein the information includes one or more feedback histories and corresponding expiration dates;
    determining, by one or more processors, whether a first feedback history of the one or more feedback histories of the database include textual data that is a match with input parameters corresponding to the first microservice request; and
    in response to determining the match, determining, by one or more processors, whether an expiration date of the first feedback history has expired.

8. The method of claim 1, wherein generating the rule corresponding to the first microservice request based at least in part on the response corresponding to the first microservice, further comprises:
    correlating, by one or more processors, the first microservice request with a corresponding collected response;
    defining, by one or more processors, a request limit corresponding to the first microservice request; and
    setting, by one or more processors, an expiration date corresponding to the first microservice request, wherein the information is the feedback history.

9. A computer program product for handling incoming microservice requests at an application server, the computer program product comprising:
    one or more computer readable storage media and program instructions stored on the one or more computer readable storage media, the program instructions comprising:
    program instructions to identify a first microservice request at an application server;
    program instructions to query a database associated with the application server for a feedback history corresponding to the first microservice request;
    program instructions to collect a response corresponding to the first microservice request; and
    program instructions to generate a rule corresponding to the first microservice request based at least in part on the response corresponding to the first microservice request; and
    program instructions to update the feedback history corresponding to the first microservice request based at least in part on the generated rule, wherein updating the feedback history further comprises:
        incrementing a counter corresponding to the first microservice request; and
        resetting an expiration date corresponding to the first microservice request, wherein the expiration date is a defined time period that the feedback history is valid.

10. The computer program product of claim 9, further comprising program instructions, stored on the one or more computer readable storage media, to:

in response to receiving a second microservice request, determine that the generated rule of the database corresponds to the second microservice request; and
return the response of the generated rule.

11. The computer program product of claim 9, further comprising program instructions, stored on the one or more computer readable storage media, to:
in response to receiving a second microservice request, determine that the a second microservice request exceeds a defined request limit of the generated rule; and
block further iterations of microservice requests of the user corresponding to the generated rule.

12. The computer program product of claim 9, further comprising program instructions, stored on the one or more computer readable storage media, to:
determine that the feedback history of the database associated with the application server is expired; and
remove the generated rule corresponding to the feedback history from the database.

13. The computer program product of claim 9, wherein the counter is incremented in response to receiving the microservice request at the application server.

14. The computer program product of claim 9, wherein program instructions to identify the first microservice request of the user at the application server, further comprise program instructions to:
request tracing of the first microservice request; and
extract input parameters corresponding to the first microservice request.

15. The computer program product of claim 9, wherein program instructions to query the database associated with the application server for the feedback history corresponding to the first microservice request, further comprise program instructions to:
transmit a request for information to the database, wherein the information includes one or more feedback histories and corresponding expiration dates;
determine whether a first feedback history of the one or more feedback histories of the database include textual data that is a match with input parameters corresponding to the first microservice request; and
in response to determining the match, determine whether an expiration date of the first feedback history has expired.

16. The computer program product of claim 9, wherein program instructions to generate the rule corresponding to the first microservice request based at least in part on the response corresponding to the first microservice request, further comprise program instructions to:
correlate the first microservice request with a corresponding collected response;
define a request limit corresponding to the first microservice request; and
set an expiration date corresponding to the first microservice request, wherein the information is the feedback history.

17. A computer system for handling incoming microservice requests at an application server, the computer system comprising:
one or more computer processors;
one or more computer readable storage media; and
program instructions stored on the computer readable storage media for execution by at least one of the one or more processors, the program instructions comprising:

program instructions to identify a first microservice request at an application server;
program instructions to query a database associated with the application server for a feedback history corresponding to the first microservice request;
program instructions to collect a response corresponding to the first microservice request; and
program instructions to generate a rule corresponding to the first microservice request based at least in part on the response corresponding to the first microservice request; and
program instructions to update the feedback history corresponding to the first microservice request based at least in part on the generated rule, wherein updating the feedback history further comprises:
incrementing a counter corresponding to the first microservice request; and
resetting an expiration date corresponding to the first microservice request, wherein the expiration date is a defined time period that the feedback history is valid.

18. The computer system of claim 17, further comprising program instructions, stored on the one or more computer readable storage media for execution by at least one of the one or more processors, to:
in response to receiving a second microservice request, determine that the generated rule of the database corresponds to the second microservice request; and
return the response of the generated rule.

19. The computer system of claim 17, further comprising program instructions, stored on the one or more computer readable storage media for execution by at least one of the one or more processors, to:
in response to receiving the second microservice request, determine that the second microservice request exceeds a defined request limit of the generated rule; and
block further iterations of microservice requests of the user corresponding to the generated rule.

20. The computer system of claim 17, further comprising program instructions, stored on the one or more computer readable storage media for execution by at least one of the one or more processors, to:
determine that the feedback history of the database associated with the application server is expired; and
remove the generated rule corresponding to the feedback history from the database.

21. The computer system of claim 17, wherein the counter is incremented in response to receiving the first microservice request at the application server.

22. The computer system of claim 17, wherein program instructions to identify the first microservice request of the user at the application server, further comprise program instructions to:
request tracing of the first microservice request; and
extract input parameters corresponding to the first microservice request.

23. The computer system of claim 17, wherein program instructions to query the database associated with the application server for the feedback history corresponding to the first microservice request, further comprise program instructions to:
transmit a request for information to the database, wherein the information includes one or more feedback histories and corresponding expiration dates;
determine whether a first feedback history of the one or more feedback histories of the database include textual data that is a match with input parameters corresponding to the first microservice request; and in response to determining the match, determine whether an expiration date of the first feedback history has expired.

24. The computer system of claim 17, wherein program instructions to generate the rule corresponding to the first microservice request based at least in part on the response corresponding to the first microservice request, further comprise program instructions to:

correlate the first microservice request with a corresponding collected response;

define a request limit corresponding to the first microservice request; and set an expiration date corresponding to the first microservice request, wherein the information is the feedback history.

* * * * *